(12) United States Patent
Shimada et al.

(10) Patent No.: US 8,493,531 B2
(45) Date of Patent: Jul. 23, 2013

(54) DISPLAY DEVICE AND ELECTRONIC APPARATUS

(75) Inventors: Yusuke Shimada, Kanagawa (JP); Yasuhiro Kanaya, Tokyo (JP); Daiki Nakajima, Shiga (JP); Keiichi Yagi, Kanagawa (JP)

(73) Assignee: Japan Display West Inc., Aichi (JP)

( * ) Notice: Subject to any disclaimer, the term of this patent is extended or adjusted under 35 U.S.C. 154(b) by 265 days.

(21) Appl. No.: 12/328,259

(22) Filed: Dec. 4, 2008

(65) Prior Publication Data

US 2009/0147197 A1 Jun. 11, 2009

(30) Foreign Application Priority Data

Dec. 7, 2007 (JP) ................................. 2007-317706

(51) Int. Cl.
*G02F 1/1333* (2006.01)
*G02F 1/1343* (2006.01)
*G02F 1/1345* (2006.01)
*G02F 1/1339* (2006.01)

(52) U.S. Cl.
USPC ............ 349/122; 348/141; 348/152; 348/153

(58) Field of Classification Search
USPC .......................................... 349/153, 138, 122
See application file for complete search history.

(56) References Cited

U.S. PATENT DOCUMENTS

| 2004/0141140 | A1* | 7/2004 | Zhang et al. | 349/152 |
| 2004/0257505 | A1* | 12/2004 | Takizawa et al. | 349/122 |
| 2005/0062898 | A1* | 3/2005 | Imayama et al. | 349/43 |
| 2005/0218396 | A1* | 10/2005 | Tsuchiya et al. | 257/13 |
| 2007/0126969 | A1* | 6/2007 | Kimura et al. | 349/141 |
| 2008/0123032 | A1* | 5/2008 | Taniguchi et al. | 349/113 |

FOREIGN PATENT DOCUMENTS

| JP | 2001-042366 | 2/2001 |
| JP | 2002-229032 | 8/2002 |
| JP | 2003-167258 | 6/2003 |
| JP | 2003-186035 | 7/2003 |
| JP | 2007-086657 | 4/2007 |
| JP | 2008-077060 | 4/2008 |

OTHER PUBLICATIONS

Japanese Office Action dated Dec. 11, 2012 for Japanese Application No. 2008-309124.

* cited by examiner

*Primary Examiner* — Wen-Ying P Chen
(74) *Attorney, Agent, or Firm* — Dentons US LLP

(57) ABSTRACT

A display device is provided which includes a base body having a pixel area in which pixels are disposed in a matrix, an organic planarizing film composed of an organic film and provided on the base body, a dry-etched film provided on the organic planarizing film and formed by dry etching, a conductive film provided on the dry-etched film, and an organic film-removed area in which the organic planarizing film is removed outside the periphery of the pixel area. In the above display device, the dry-etched film or a film provided before the dry-etched film is formed is terminated in the organic film-removed area.

10 Claims, 14 Drawing Sheets

Prior Art

FIG. 2A
Prior Art
FIG. 2B
Prior Art
FIG. 2C
Prior Art
FIG. 2D
Prior Art
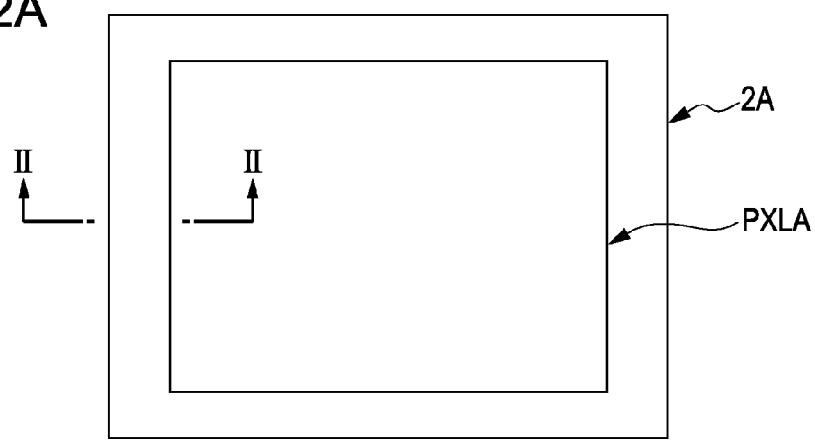
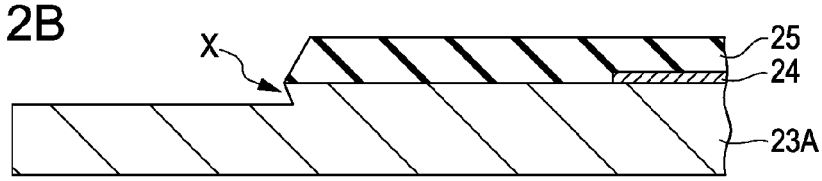
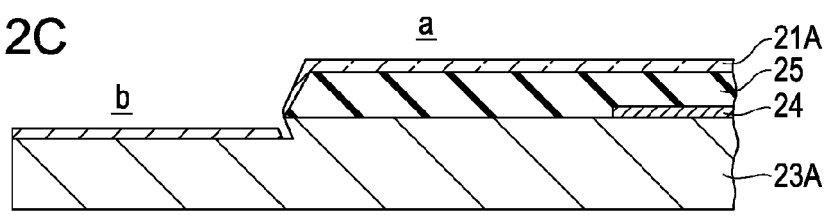
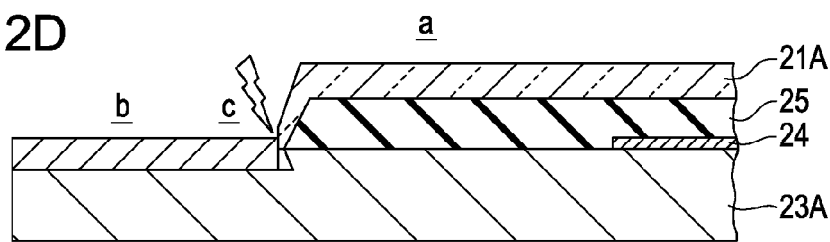

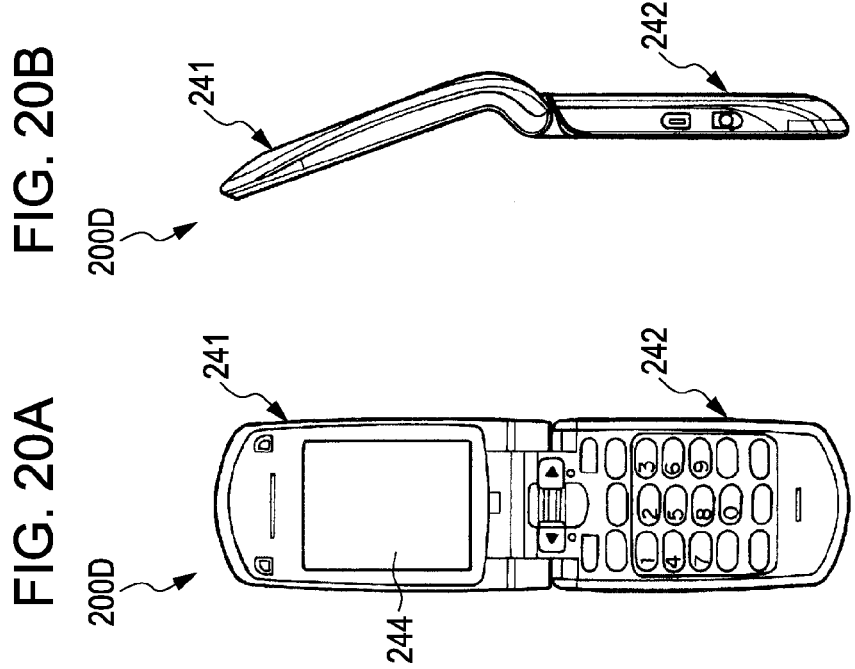
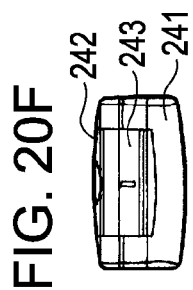
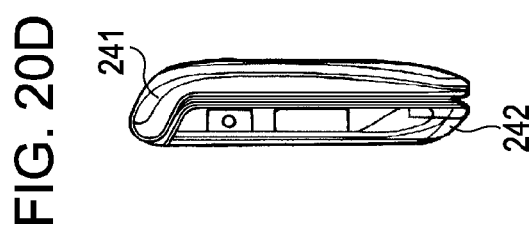
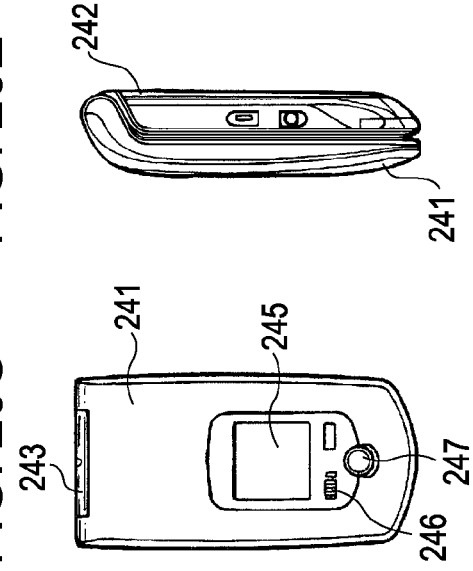
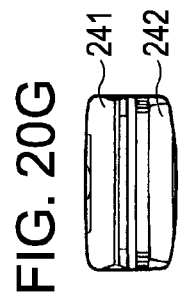

DISPLAY DEVICE AND ELECTRONIC APPARATUS

CROSS REFERENCES TO RELATED APPLICATIONS

The present invention contains subject matter related to Japanese Patent Application JP 2007-317706 filed in the Japanese Patent Office on Dec. 7, 2007, the entire contents of which are incorporated herein by reference.

BACKGROUND OF THE INVENTION

1. Field of the Invention

The present invention relates to a display device having an organic planarizing film and to an electronic apparatus using the display device.

2. Description of the Related Art

Because of features, such as small thickness and low electrical power consumption, liquid crystal display devices have been used for various types of electronic apparatuses. For example, as the electronic apparatuses each using a liquid crystal display device, a notebook type personal computer, a display device for car navigation system, a personal digital assistant (PDA), a mobile phone, a digital camera, and a video camera may be mentioned.

FIGS. 1A to 1C are views each showing the structure of a general liquid crystal display device, FIG. 1A is a cross-sectional view of a device structure, FIG. 1B is a plan view of a TFT substrate side taken along the line I-I in FIG. 1A, and FIG. 1C is a plan view of a counter substrate side taken along the same line as described above.

A liquid crystal display device 1 includes an array substrate (substrate on which active elements are formed) 2, a transparent counter substrate 3 disposed to face the array substrate 2, and a liquid crystal layer 4 disposed between the above two substrates 2 and 3.

Pixels including transparent electrodes (pixel electrodes) 21 for applying a voltage to a liquid crystal and thin film transistors (TFTs) 22 for selecting the transparent electrodes 21 are disposed in a matrix on the array substrate 2, so that a pixel area PXLA is formed.

In addition, in order to reduce steps formed on the thin film transistors, a planarizing film 23 is provided between the transparent electrodes 21 and the thin film transistors 22 provided on the array substrate 2.

On the counter substrate 3, a color filter portion 31 composed of black (BK), red (R), green (G), blue (B), and the like which correspond to pixels PXLs on the array substrate 2 is formed, and in order to reduce steps formed on the color filter portion 31, a planarizing film 32 composed of an organic film is also formed.

A transparent electrode 33 is formed on the planarizing film 32 at the side facing the liquid crystal layer 4 for applying a voltage to a liquid crystal.

In addition, in order to fix the array substrate 2 and the counter substrate 3 and to enclose the liquid crystal therebetween, a sealing area 5 is formed so as to surround the pixel area PXLA in which the pixels PXL are formed.

As described above, in the general liquid crystal display device 1, constituent elements, such as metal wires 24 including array drive terminals, the transistors 22, and the transparent electrodes (transparent conductive films) 21, are disposed on the array substrate 2 which is one of the substrates facing each other. In addition, constituent elements, such as a color filter displaying colors, are disposed on the counter substrate 3.

In addition, since steps are formed on each surface closest to the liquid crystal layer 4 due to the presence of the constituent elements described above, the distance in the plane of the liquid crystal between the above two substrates is changed, so that image quality, such as contrast, is degraded by the deviation in liquid crystal optical properties which occurs between the pixels and/or in the pixels.

In order to prevent the above problem, planarizing films each composed of an organic film are provided at the substrate sides so as to planarize the steps caused by the wires and the like.

In addition, when the organic film is extended outside past the sealing area which is formed to fix the two substrates of the liquid crystal display device and to enclose the liquid crystal, the in-plane uniformity of optical properties of the liquid crystal display device can be improved.

In addition, in order to ensure a wide viewing angle of a liquid crystal display device, various liquid crystal display devices using a fringe field switching (hereinafter referred to as "FFS") method have been proposed (see Japanese Unexamined Patent Application Publication Nos. 2002-229032 and 2001-42366).

In a liquid crystal display device having a fringe field switching (FSS) structure, a counter transparent electrode is not disposed at a counter substrate side but is disposed at an array substrate side.

In particular, a counter electrode (common electrode) is formed on a planarizing film composed of an organic film at the array substrate side, a pixel insulating film ($SiO_2$, SiN, or the like) is formed on this counter electrode, and pixel electrodes (transparent electrodes) composed, for example, of ITO are formed on this pixel insulating film at the side of an interface with a liquid crystal layer.

SUMMARY OF THE INVENTION

In an FSS mode liquid crystal display device, when an insulating film between a counter electrode (common electrode) and pixel electrodes is patterned, dry etching is used in many cases.

In this case, in general, dry etching is performed, for example, in an inductively coupled plasma (ICP), a plasma etching (PE), or a chemical dry etching (CDE) apparatus, and a fluorine gas is used as an etching gas.

FIGS. 2A to 2D each show the state in which dry etching is performed on an organic film of an FFS mode liquid crystal display device 1A.

FIG. 2A shows a plan view, and FIGS. 2B to 2D are cross-sectional views each showing a step of dry etching process taken along the line II-II in FIG. 2A.

In FIGS. 2A to 2D, reference numeral 2A indicates an array substrate, reference numeral 21A indicates a transparent electrode (pixel electrode), reference numeral 23A indicates an organic planarizing film, reference numeral 24 indicates a counter electrode (common electrode), and reference numeral 25 indicates an insulating film (dry-etched film).

Heretofore, as shown in FIG. 2B, when dry etching is performed on the organic film, over-etching of the organic film occurs at an end portion of the dry-etched film 25, and as shown by X in the figure, a cross-section having a reverse taper shape is formed.

After the dry etching described above, when an electrode film (transparent electrode film, such as ITO, in an FSS mode liquid crystal display device or metal thin film composed of Al, Ag, or the like in another mode liquid crystal display device) is formed by sputtering, at an initial film forming stage, the film is placed in a disconnected state at the reverse taper position as shown in FIG. 2C.

In sputtering, since a substrate is directly exposed to plasma, charged ions and electrons bombard the film, and hence the electrode film is electrified.

In FIG. 2C, when the structure is formed such that a "b" portion is insulated, and an "a" portion has the structure in which charges obtained from the plasma escape, a potential difference is generated between the "a" portion and the "b" portion.

When the film formation further advances, and the state shown in FIG. 2D is formed, the "a" portion and the "b" portion come into contact with each other, and discharge occurs such that charges which accumulate at the "b" portion escape to the "a" portion. As a result, at a "c" portion shown in FIG. 2D, the film is melted by the discharge.

When patterning is performed by etching after film formation, since the melted portion is recrystallized, the crystallinity is better than the other portion, so that the etching rate is extremely decreased. As a result, patterning defects occur, thereby causing display failure in a display device.

In order to prevent defect generation caused by this discharge, the influence of the discharge is eliminated by ensuring a sufficient distance from a discharge generation position to an effective display area.

However, by the method described above, redundancy in terms of layout is increased, and as a result, the device area is disadvantageously increased.

According to the present invention, it is preferable to provide a display device in which when a dry-etched film is formed by dry etching, at an end portion thereof, an organic planarizing film is prevented from having a reverse taper shape and in which defect generation caused by discharge can also be prevented and to provide an electronic apparatus using the above display device.

A display device according to a first embodiment of the present invention includes: a base body having a pixel area in which pixels are disposed in a matrix; an organic planarizing film composed of an organic film and provided on the base body; a dry-etched film provided on the organic planarizing film and formed by dry etching; a conductive film provided on the dry-etched film; and an organic film-organic in which the organic planarizing film is removed outside the periphery of the pixel area, and in this display device, the dry-etched film or a film provided before the dry-etched film is formed is terminated in the organic film-removed area.

It is preferable that the organic film-removed area be an area in which outside the periphery of the pixel area, the organic planarizing film be removed partly in a direction parallel to a primary surface of the base body and is removed entirely in a direction perpendicular thereto.

It is preferable that the organic film-removed area be continuously formed so as to surround the pixel area along the entire periphery thereof.

It is preferable that the organic film-removed area be intermittently provided along the periphery of the pixel area.

It is preferable that the organic planarizing film outside the organic film-removed area be entirely removed.

The film formed before the dry-etched film is formed preferably includes one element selected from the group including silicon, indium, tin, zinc, titanium, aluminum, molybdenum, tantalum, chromium, tungsten, and silver.

The base body preferably includes a film or a substrate including one element selected from the group including silicon, indium, tin, zinc, titanium, aluminum, molybdenum, tantalum, chromium, tungsten, and silver.

A display device according to a second embodiment of the present invention includes: a first substrate having a pixel area in which pixels are disposed in a matrix; a second substrate disposed to face the first substrate; a liquid crystal layer disposed between the first substrate and the second substrate; an organic planarizing film composed of an organic film and provided on the first substrate; a counter electrode provided on the organic planarizing film; a dry-etched film provided on the counter electrode and the organic planarizing film and formed by dry-etching; pixel electrodes provided on the dry-etched film; and an organic film-removed area in which the organic planarizing film is removed outside the periphery of the pixel area. In the display device described above, the dry-etched film or a film of the same layer as that for the counter electrode which is provided before the dry-etched film is formed is terminated in the organic film-removed area.

An electronic apparatus according to a third embodiment of the present invention includes: a display device, wherein the display device includes: a base body having a pixel area in which pixels are disposed in a matrix; an organic planarizing film composed of an organic film and provided on the base body; a dry-etched film provided on the organic planarizing film and formed by dry etching; a conductive film provided on the dry-etched film; and an organic film-removed area in which the organic planarizing film is removed outside the periphery of the pixel area, and the dry-etched film or a film provided before the dry-etched film is formed is terminated in the organic film-removed area.

In an electronic apparatus including a display device, according to a fourth embodiment of the present invention, the display device includes: a first substrate having a pixel area in which pixels are disposed in a matrix; a second substrate disposed to face the first substrate; a liquid crystal layer disposed between the first substrate and the second substrate; an organic planarizing film composed of an organic film and provided on the first substrate; a counter electrode provided on the organic planarizing film; a dry-etched film provided on the counter electrode and the organic planarizing film and formed by dry-etching; pixel electrodes provided on the dry-etched film; and an organic film-removed area in which the organic planarizing film is removed outside the periphery of the pixel area, and the dry-etched film or a film of the same layer as that for the counter electrode which is provided before the dry-etched film is formed is terminated in the organic film-removed area.

According to the present invention, when the dry-etched film is formed by dry etching, the organic planarizing film is prevented from having a reverse taper shape at the film end portion of the dry-etched film, and as a result, defect generation caused by discharge can be prevented.

BRIEF DESCRIPTION OF THE DRAWINGS

FIGS. 2A to 2D are views each showing the state in which an organic film of an FSS mode liquid crystal display device 1A is dry-etched;

FIGS. 20A to 20G are views each showing a portable terminal device, such as a mobile phone, which uses the display device according to one of the embodiments.

DESCRIPTION OF THE PREFERRED EMBODIMENTS

Hereinafter, embodiments of the present invention will be described with reference to the accompanying drawings.

First Embodiment

Figure 1A:
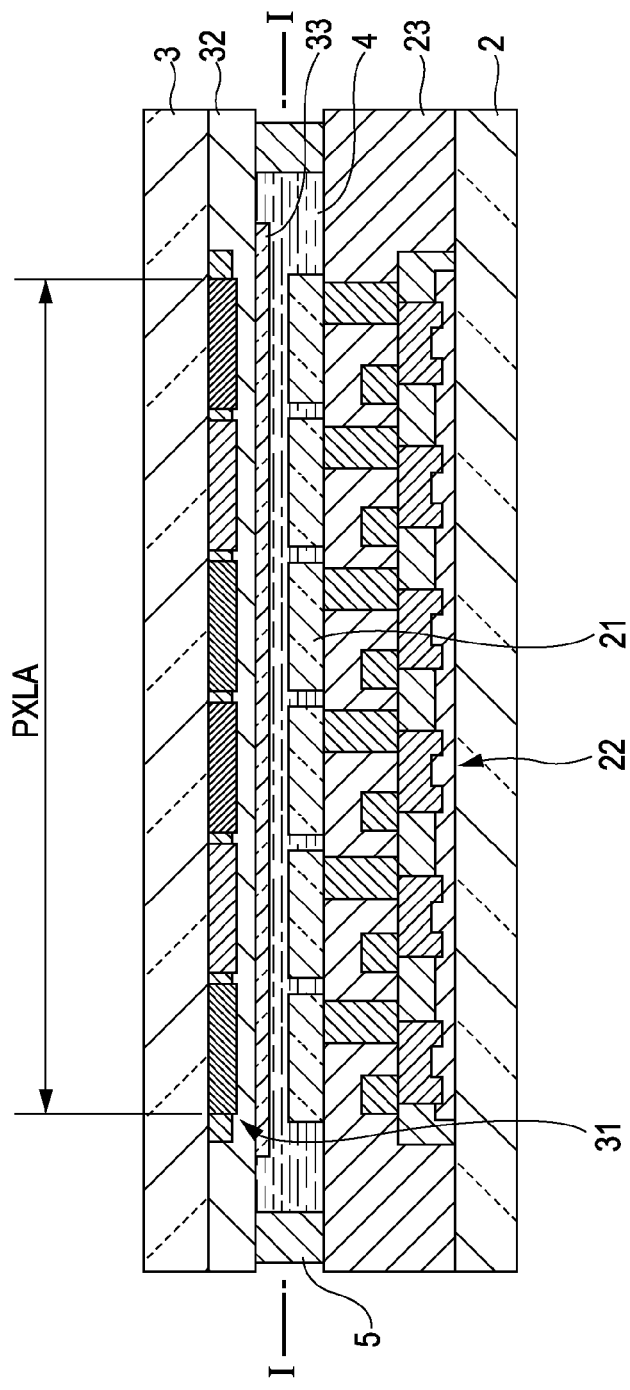
FIGS. 1A to 1C are views each showing the structure of a general liquid crystal display device.
Figure 1B:
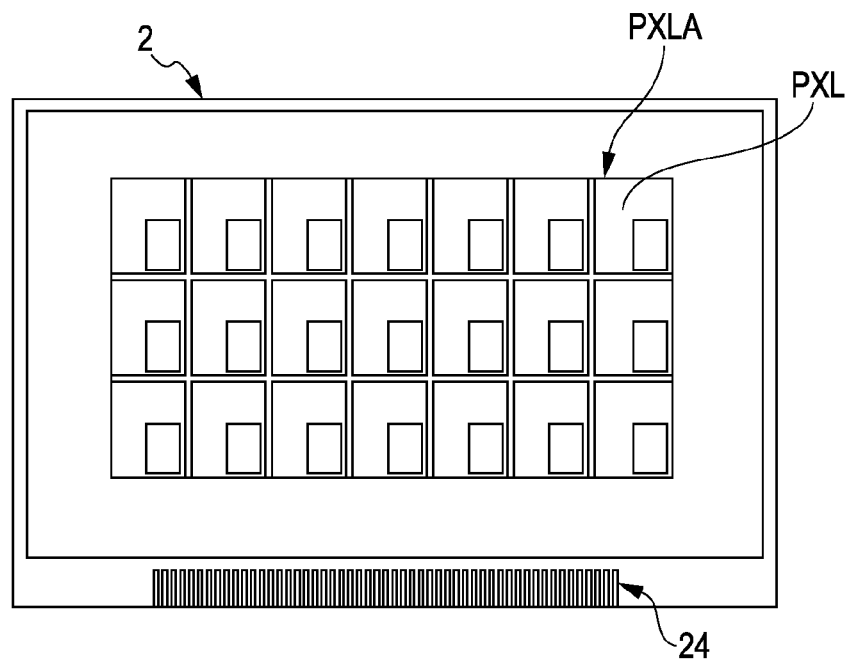
Figure 1C:
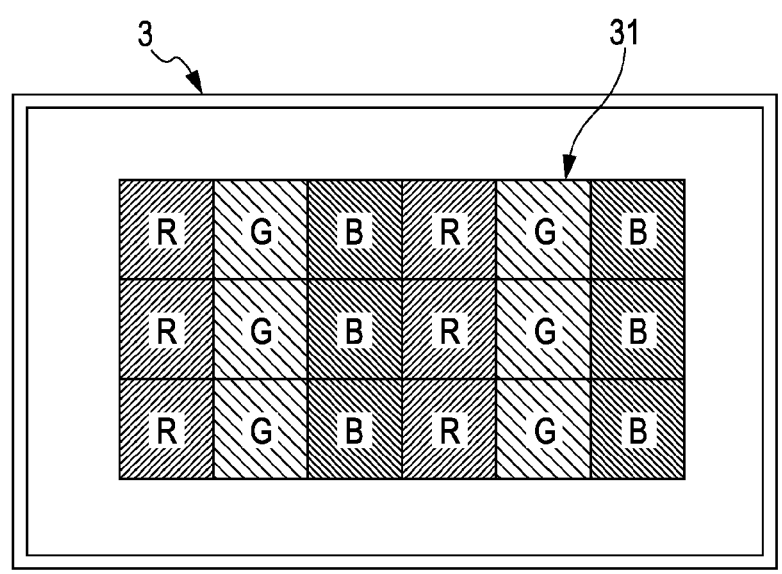
Figure 3:
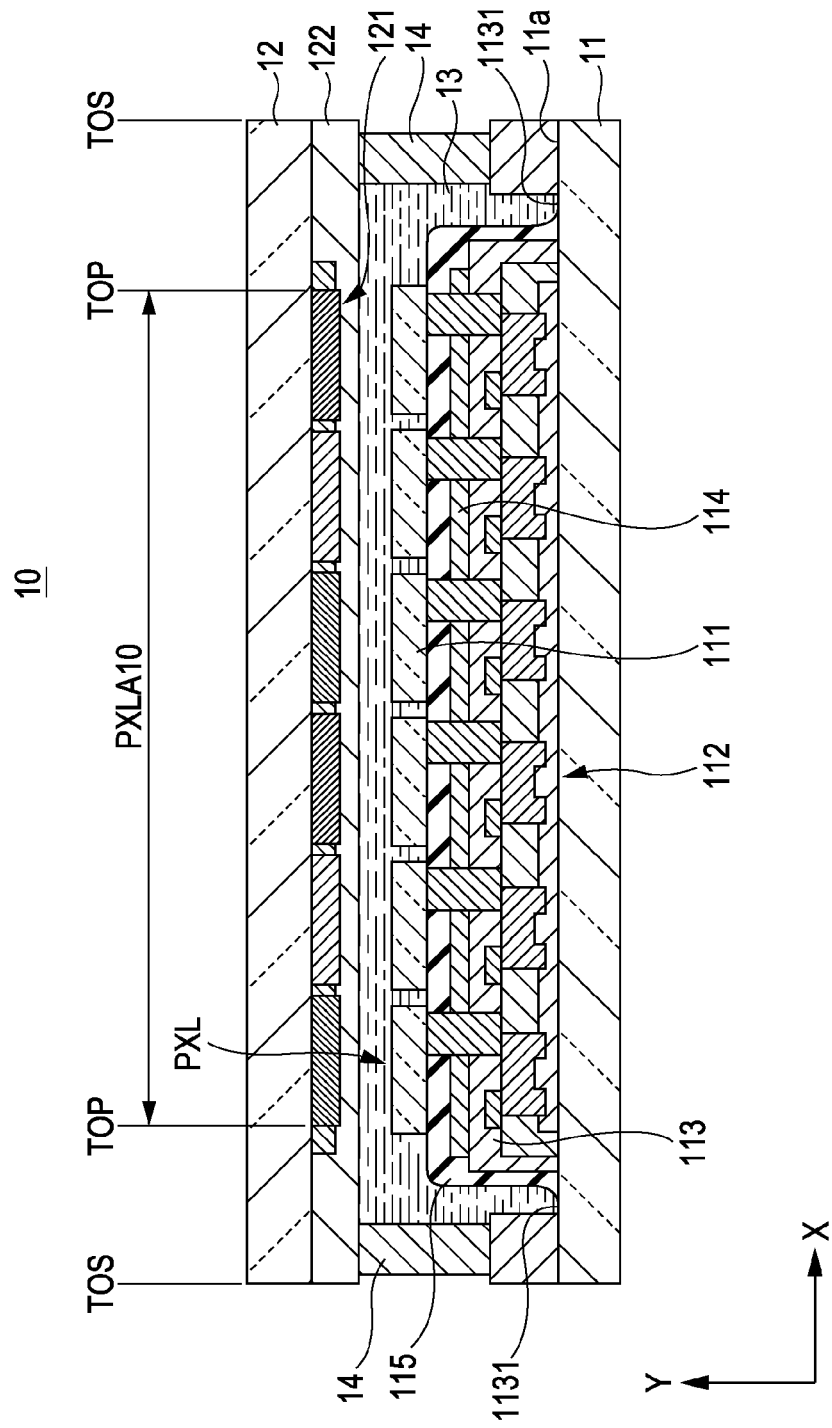
FIG. 3 is a schematic cross-sectional view showing the structure of an active matrix type liquid crystal display device according to a first embodiment of the present invention.
Figure 4:
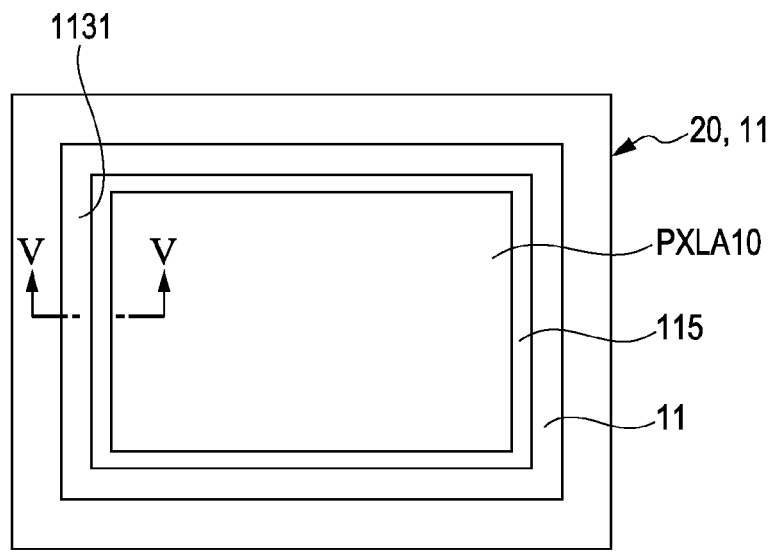
FIG. 4 is a plan view showing the structure of the active matrix type liquid crystal display device according to the first embodiment.
Figure 5:
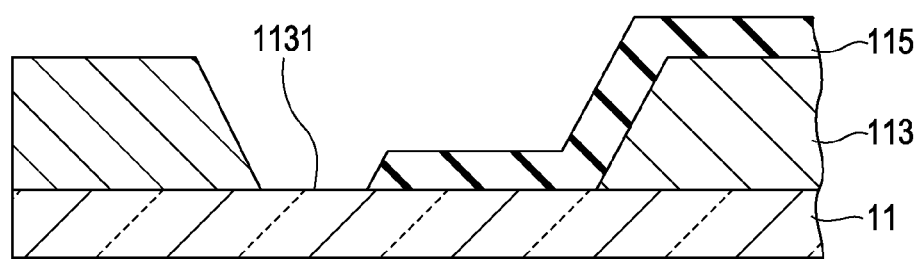
FIG. 5 is a schematic cross-sectional view taken along the line V-V shown in FIG. 4.

FIG. 3 is a schematic cross-sectional view showing the structure of an active matrix type liquid crystal display device according to the first embodiment of the present invention. FIG. 4 is a plan view showing the structure of the active matrix type liquid crystal display device according to the first embodiment. FIG. 5 is a schematic cross-sectional view taken along the line V-V shown in FIG. 4.

A liquid crystal display device (LCD) 10 according to this embodiment includes, as shown in FIG. 3, an array substrate (substrate on which active elements are formed) 11 functioning as a base body (first substrate) having high dry etching resistance, a counter substrate 12 functioning as a second substrate disposed to face the array substrate 11, and a liquid crystal layer 13 disposed between the array substrate 11 and the counter substrate 12.

In addition, in order to ensure a wide viewing angle, the liquid crystal display device 10 according to this embodiment is formed as a liquid crystal display device having a fringe field switching (FSS) structure.

The array substrate 11 is formed, for example, of quartz when the display device is a transmissive type and is formed, for example, of a silicon material when the display device is a reflective type. The counter substrate 12 is formed, for example, of glass or quartz.

The base body according to this embodiment of the present invention is formed as the array substrate 11 and is composed, for example, of a film or a substrate containing one element selected from the group including silicon, indium, tin, zinc, titanium, aluminum, molybdenum, tantalum, chromium, tungsten, and silver, which has high dry etching resistance, that is, which is difficult to be dry-etched.

On the array substrate 11, transparent electrodes (pixel electrodes, transparent conductive films) 111 for applying a voltage to a liquid crystal are formed, and pixels PXLs including thin film transistors (TFT) 112 for selecting the transparent electrodes 111 are disposed in a matrix, so that a pixel area PXLA 10 is formed.

In addition, in order to reduce steps formed on the thin film transistors 112, an organic planarizing film 113 composed of a first organic film is formed between the transparent electrodes 111 and the thin film transistors 112 provided on the array substrate 11.

Since the liquid crystal display device 10 has an FSS structure, a counter transparent electrode is not provided at a counter substrate 12 side but is disposed at an array substrate 11 side.

In particular, at the array substrate 11 side, a counter electrode 114 is formed on the organic planarizing film 113 composed of the first organic film, a pixel insulating film 115 is formed thereon as a dry-etched film, and the pixel electrodes (transparent electrodes in the case of a transmissive type) 111 are formed on this pixel insulating film 115 at the side of an interface with the liquid crystal layer 13.

The pixel insulating film 115 is formed, for example, of SiN.

As described above, the liquid crystal display device 10 includes the array substrate 11, the counter electrode (common electrode) 114, the pixel insulating film 115, and the pixel electrodes 111 provided in that order from the bottom side and has a pixel structure in which the liquid crystal is driven by an electric field approximately parallel to a primary surface 11a of the array substrate 11.

On the counter substrate 12, a color filter portion 121 is formed which includes black (BK), red (R), green (G), blue (B), and the like corresponding to the pixels PXLs provided on the array substrate 11, and an organic planarizing film 122 composed of a second organic film is formed so as to reduce steps formed on the color filter portion 121.

In addition, in order to fix the two substrates, that is, the array substrate 11 and the counter substrate 12, and to enclose the liquid crystal therebetween, a sealing area 14 is formed by a predetermined sealing material so as to surround the pixel area PXLA 10 in which the pixels PXLs are formed.

The transparent electrodes 111 and the counter electrode 114 are each formed of a transparent conductive thin film, such as an indium tin oxide (ITO) film.

By the constituent elements described above, an LCD panel 20 is formed.

Accordingly, the liquid crystal display device 10 according to this embodiment is characterized by the shape of the organic planarizing film composed of an organic film provided on the array substrate 11 and the end portion of the pixel insulating film 115 which is a dry-etched film.

In this first embodiment, as shown in FIGS. 3 and 5, in an area from an outermost end TOS of the sealing area 14 to a peripheral end TOP of the pixel area PXLA 10, the first organic film forming the organic planarizing film 113 provided at the array substrate 11 side is removed partly in a direction (X direction of the XY coordinates shown in FIG. 2) parallel to the primary surface 11a of the array substrate 11 and is removed entirely in a direction perpendicular thereto, so that an organic film-removed area (or groove) 1131 is formed.

In the first embodiment, as shown in FIG. 4, the organic film-removed area 1131 is continuously formed so as to surround the entire periphery of the pixel area PXLA 10.

In the organic film-removed area (or groove) 1131, the organic film is removed so as to expose the surface (primary surface 11a) of the array substrate 11.

As described above, the bottom portion of the groove thus exposed, that is, the surface of the array substrate 11, is formed of a film or a substrate containing one element selected from the group including silicon, indium, tin, zinc, titanium, aluminum, molybdenum, tantalum, chromium, tungsten, and silver, which has high dry etching resistance, that is, which is difficult to be dry-etched.

In addition, the pixel insulating film 115 as a dry-etched film is terminated in the organic film-removed area (or groove) 1131.

As described above, in a process for forming the liquid crystal display device 10 in which the pixel insulating film 115 as a dry-etched film is terminated at an organic film-removed area (or groove) 1131, when the pixel insulating film 115 is dry-etched to form the dry-etched film, the organic planarizing film 113 is prevented from having a reverse taper shape at a film end portion of the dry-etched film.

Hence, according to the liquid crystal display device of this embodiment, even when an electrode film is formed on the pixel insulating film 115, which is a dry-etched film, the electrode film is not placed in a disconnected state at a reverse tapered portion of the organic planarizing film 113, so that defect generation caused by discharge can be prevented.

In addition, in order to prevent the defect generation caused by discharge, according to an existing structure, the influence of the discharge is eliminated by ensuring a sufficient distance from the discharge generation position to the effective display area; however, by the method described above, the redundancy in terms of layout is increased, and as a result, a picture-frame area located outside the display area is disadvantageously increased.

However, according to the structure of this embodiment, the picture-frame area located outside the image area (display area) can be reduced, and hence reduction in size and weight of electronic devices can be realized.

Second Embodiment

Figure 6:
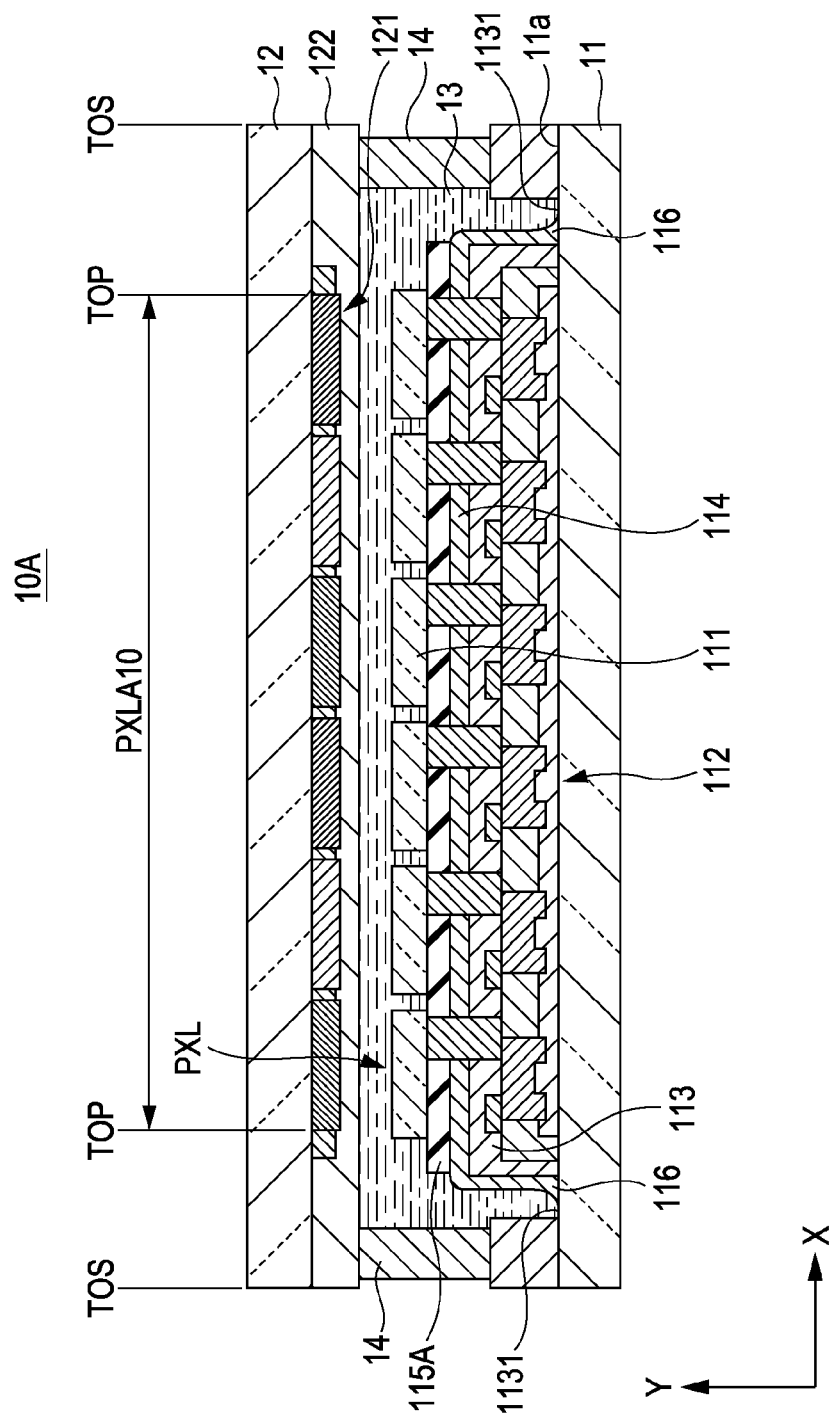
FIG. 6 is a schematic cross-sectional view showing the structure of an active matrix type liquid crystal display device according to a second embodiment of the present invention.
Figure 7:
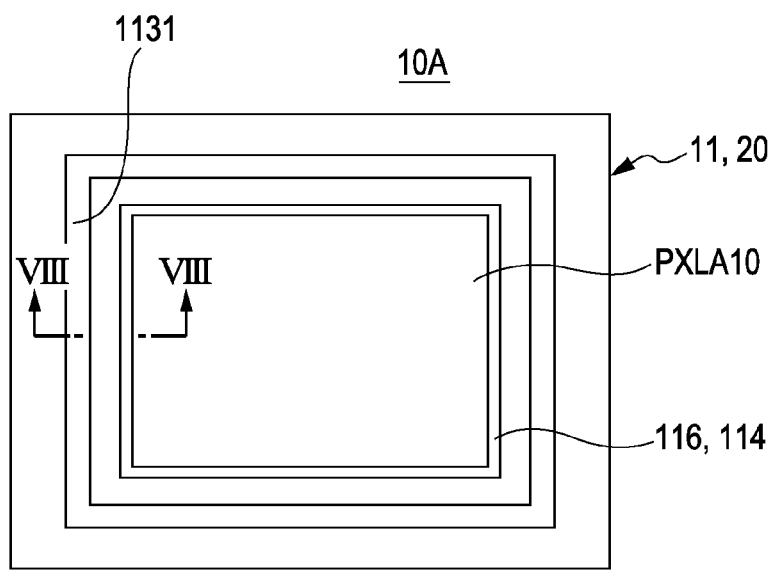
FIG. 7 is a plan view showing the structure of the active matrix type liquid crystal display device according to the second embodiment.
Figure 8:
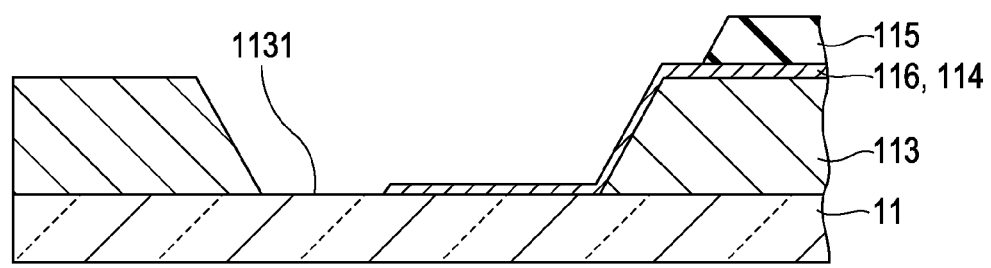
FIG. 8 is a schematic cross-sectional view taken along the line VIII-VIII shown in FIG. 7.

FIG. 6 is a schematic cross-sectional view showing the structure of an active matrix type liquid crystal display device according to the second embodiment of the present invention. FIG. 7 is a plan view showing the structure of the active matrix type liquid crystal display device according to the second embodiment. FIG. 8 is a schematic cross-sectional view taken along the line VIII-VIII shown in FIG. 7.

The differences of a liquid crystal display device 10A according to the second embodiment from the liquid crystal display device 10 according to the first embodiment are that the film terminated in the organic film-removed area (or groove) 1131 is not the pixel insulating film 115 as a dry-etched film but is a film (hereinafter referred to as a "protective film", and is a film forming the counter electrode (common electrode) 114 in this embodiment) 116 formed before this pixel insulating film 115 is formed and that the pixel insulating film 115 as a dry-etched film is terminated on the protective film 116 which is extended from the counter electrode 114.

The protective film is formed from a film containing an element selected from the group including silicon, indium, tin, zinc, titanium, aluminum, molybdenum, tantalum, chromium, tungsten, and silver.

According to this second embodiment, an effect similar to that of the above first embodiment can be obtained.

Third Embodiment

Figure 9:
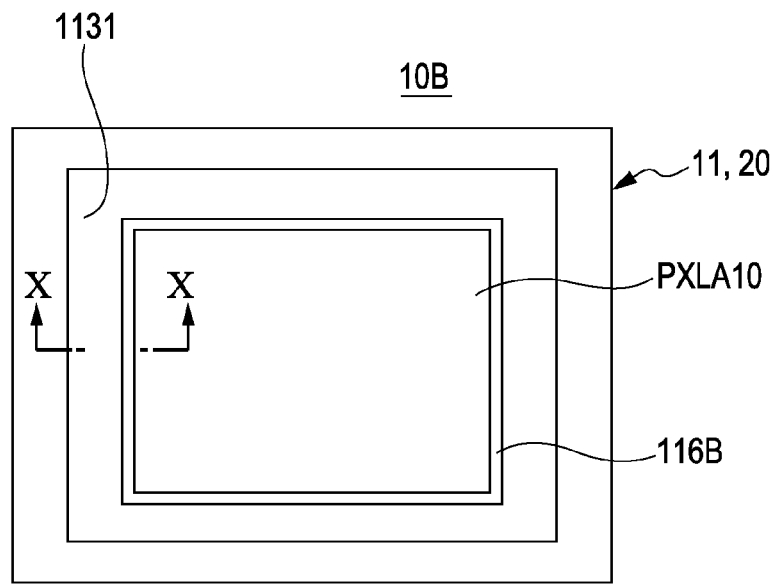
FIG. 9 is a plan view showing the structure of an active matrix type liquid crystal display device according to a third embodiment of the present invention.
Figure 10:
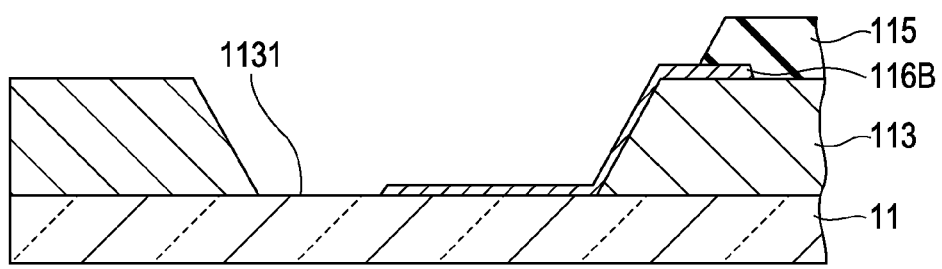
FIG. 10 is a schematic cross-sectional view taken along the line X-X shown in FIG. 9.

FIG. 9 is a plan view showing the structure of an active matrix type liquid crystal display device according to the third embodiment of the present invention. FIG. 10 is a schematic cross-sectional view taken along the line X-X shown in FIG. 9.

The difference of a liquid crystal display device 10B according to the third embodiment from the liquid crystal display device 10A according to the second embodiment is that although in the second embodiment, the protective film, which is formed by simply extending the counter electrode 114 provided before the pixel insulating film 115 as a dry-etched film is formed, is terminated in the organic film-removed area (or groove) 1131, in the third embodiment, a film 116 of the same layer as that for the counter electrode 114 is formed from a position located on the organic film to a position inside the organic film-removed area (or groove) 1131 and is terminated therein.

In other words, a protective film 116B is formed from the same layer as that for the counter electrode 114 but is provided apart therefrom with a space having a predetermined distance.

According to this third embodiment, an effect similar to that of the above first or the second embodiment can be obtained.

Fourth Embodiment

Figure 11:
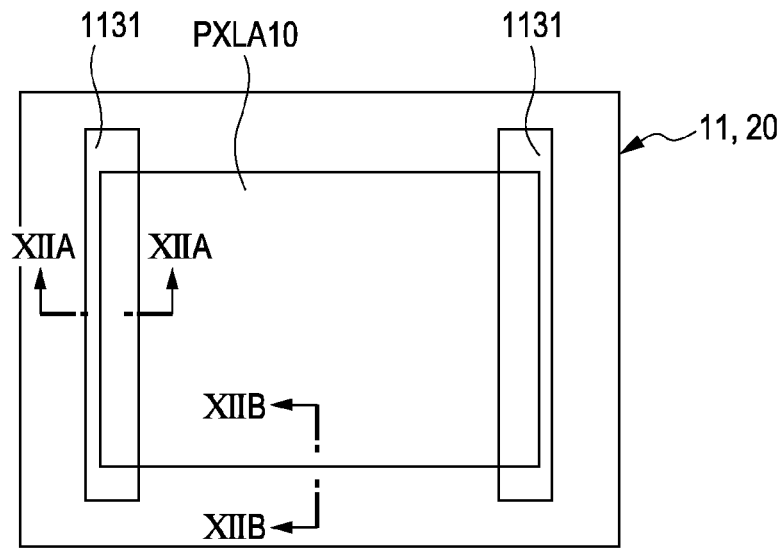
FIG. 11 is a plan view showing the structure of an active matrix type liquid crystal display device according to a fourth embodiment of the present invention.
Figure 12A:
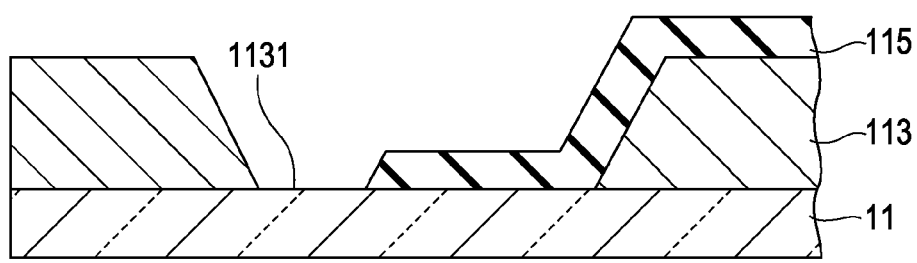
FIGS. 12A and 12B are schematic cross-sectional views taken along the line XIIA-XIIA and the line XIIB-XIIB, respectively, shown in FIG. 11.

FIG. 11 is a plan view showing the structure of an active matrix type liquid crystal display device according to the fourth embodiment of the present invention. FIG. 12A is a schematic cross-sectional view taken along the line XIIA-XIIA shown in FIG. 11, and FIG. 12B is a schematic cross-sectional view taken along the line XIIB-XIIB in FIG. 11.

The difference of a liquid crystal display device 10C according to the fourth embodiment from the liquid crystal display device 10 according to the first embodiment is that instead of continuously forming the organic film-removed area (or groove) 1131 so as to surround the entire periphery of the pixel area PXLA 10, the organic film-removed area (or groove) 1131 is intermittently provided at a plurality positions.

Figure 12B:
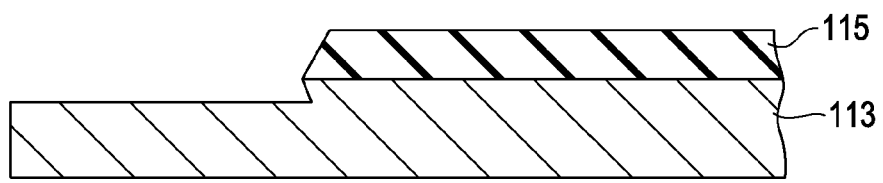

In this case, as shown in FIG. 12B, at a place at which the organic film-removed area (or groove) 1131 is not formed, a reverse tapered shape may be formed in the organic planarizing film 113 with high probability; however, at a place at which the organic film-removed area (or groove) 1131 is formed, as shown in FIG. 12A, a reverse tapered shape caused by overetching is not formed. Hence, during subsequent film formation by sputtering, the film is not divided.

In addition, in order to prevent discharge by maintaining superior contact of an electrode film formed by sputtering, the total length of the organic film-removed area (or groove) 1131 along the periphery of the pixel area (display area) must be at least one third of the periphery thereof.

Fifth Embodiment

Figure 13:
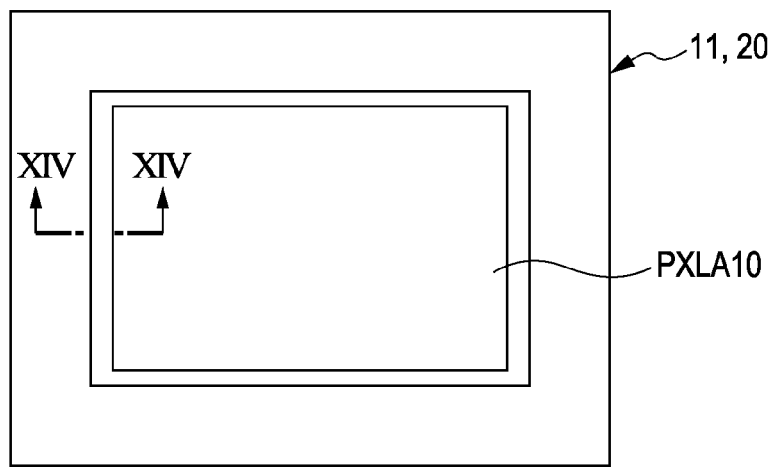
FIG. 13 is a plan view showing the structure of an active matrix type liquid crystal display device according to a fifth embodiment of the present invention.
Figure 14:
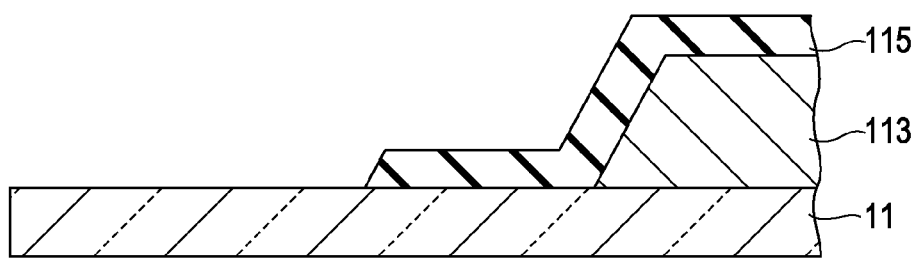
FIG. 14 is a schematic cross-sectional view taken along the line XIV-XIV shown in FIG. 13.

FIG. 13 is a plan view showing the structure of an active matrix type liquid crystal display device according to the fifth embodiment of the present invention. FIG. 14 is a schematic cross-sectional view taken along the line XIV-XIV in FIG. 13.

The difference of a liquid crystal display device 10D according to the fifth embodiment from the liquid crystal display device 10 according to the above first embodiment is that the organic planarizing film outside the organic film-removed area (or groove) 1131 is entirely removed.

Even when the organic planarizing film outside the organic film-removed area (or groove) 1131 is entirely removed, an effect similar to that obtained in each of the above embodiments can be obtained.

As described above, according to this embodiment, when the dry-etched film is formed by dry etching, the organic planarizing film can be prevented from having a reverse tapered shape at the film end portion of the dry-etched film, and as a result, defect generation caused by discharge can be prevented.

In addition, since it is not necessary to ensure a sufficient distance from the discharge generation position to the effective display area so as to prevent defect generation caused by discharge, the picture-frame area which is outside the pixel area (display area) can be reduced, so that reduction in size and weight of electronic devices can be realized.

Accordingly, even when the present invention is applied to any types of liquid crystal display devices of an optical rotation mode, a birefringence mode, and the like, such as a simple matrix type, a TFT active matrix type, and a TFD active matrix type liquid crystal display devices, the effect described above can be expected.

In addition, the present invention may also be applied to an organic EL display or the like as well as to a liquid crystal display device.

Figure 15:
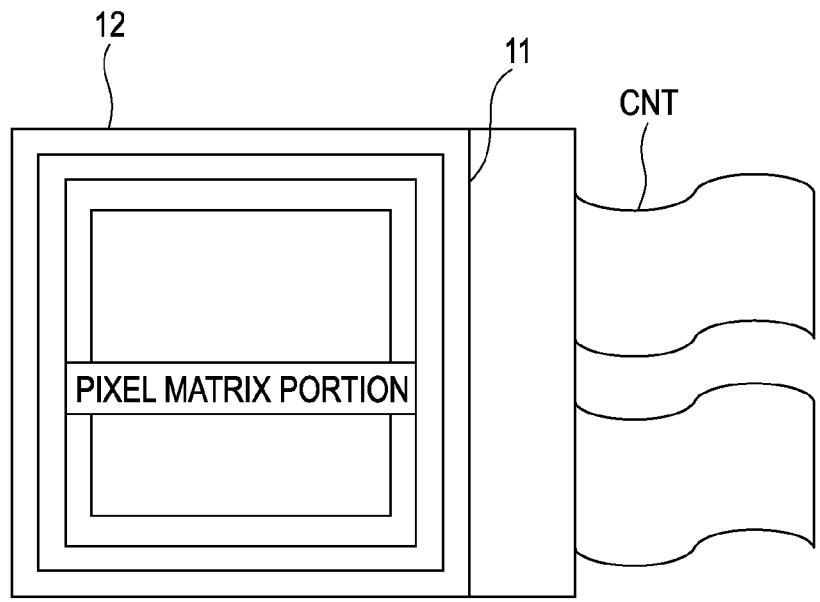
FIG. 15 is a schematic view showing an example of a flat type module shape.

The display device according to this embodiment also includes a display device having a flat type module shape as shown in FIG. 15.

For example, a display module is formed such that a pixel array portion in which pixels including thin film transistors, a liquid crystal, and the like are integrally formed in a matrix is provided on the insulating substrate 11, an adhesive is provided so as to surround this pixel array portion (pixel matrix portion), and a counter substrate composed of a glass or the like is adhered thereto.

A color filter, a protective film, a light shading film, and the like may be provided for this transparent counter substrate 12 whenever necessary as described in the above embodiments. A flexible printed circuit (FPC) may also be provided to the display module as a connector CNT for inputting/outputting signals or the like from and to the outside.

The display devices according to the embodiments described above may be applied to display devices of electronic apparatuses in any fields in which video signals input to electronic apparatuses or generated therein are displayed as images or video pictures, and as the display devices described above, for example, as shown in FIGS. 16 to 20, a digital camera, a notebook type personal computer, a portable terminal device including a mobile phone, and a video camera may be mentioned.

Hereinafter, examples of electronic apparatuses which use the display devices according to the embodiments of the present invention will be described.

Figure 16:
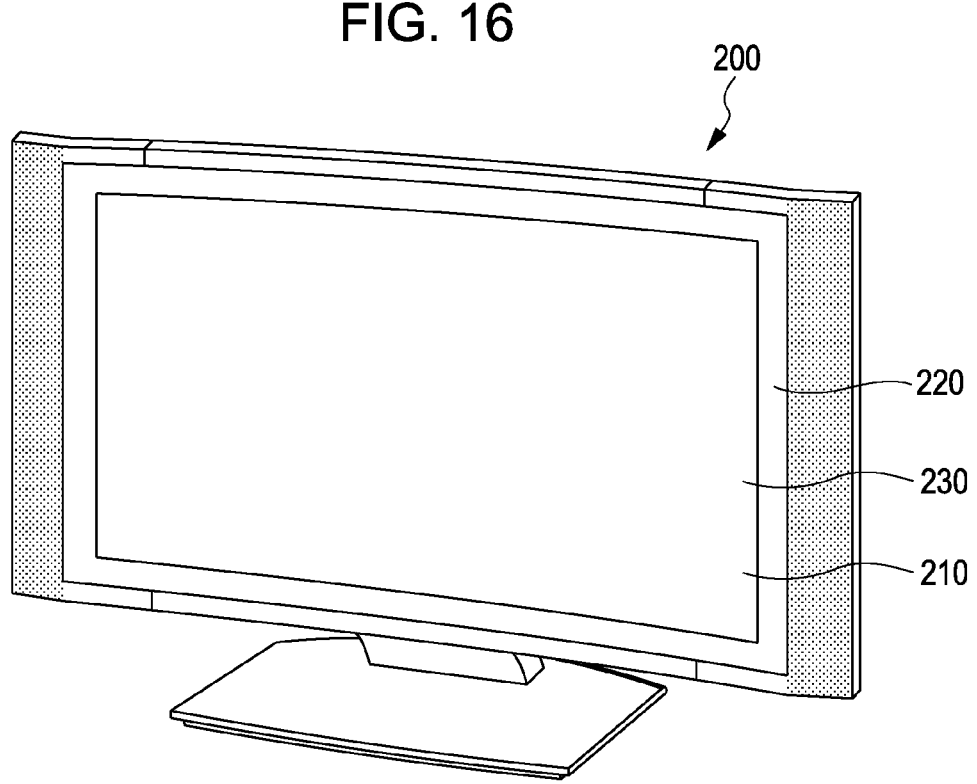
FIG. 16 is a perspective view showing a television which uses the display device according to one of the embodiments.

FIG. 16 is a perspective view showing a television which uses the display device according to one of the above embodiments.

A television 200 according to this example has a video image display screen portion 210 including a front panel 220, a filter glass 230, and the like and is formed by using the display device according to one of the above embodiments as the video image display screen portion 210.

Figure 17A:
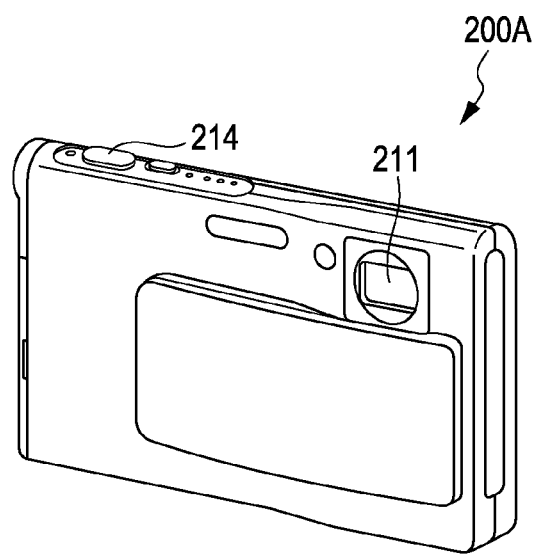
FIGS. 17A and 17B are perspective views each showing a digital camera which uses the display device according to one of the embodiments.
Figure 17B:
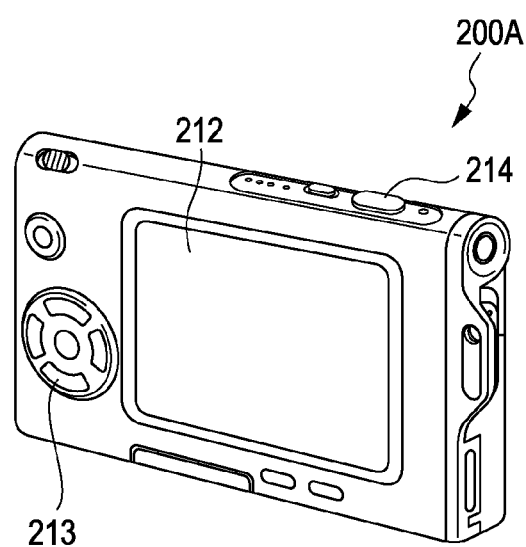

FIGS. 17A and 17B are perspective views each showing a digital camera which uses the display device according to one of the above embodiments, FIG. 17A is a perspective view when viewed from a front side, and FIG. 17B is a perspective view when viewed from a rear side.

A digital camera 200A according to this example includes a flash lighting unit 211, a display unit 212, a menu switch 213, a shutter bottom 214, and the like and is formed by using the display device according to one of the above embodiments as the display portion 212.

Figure 18:
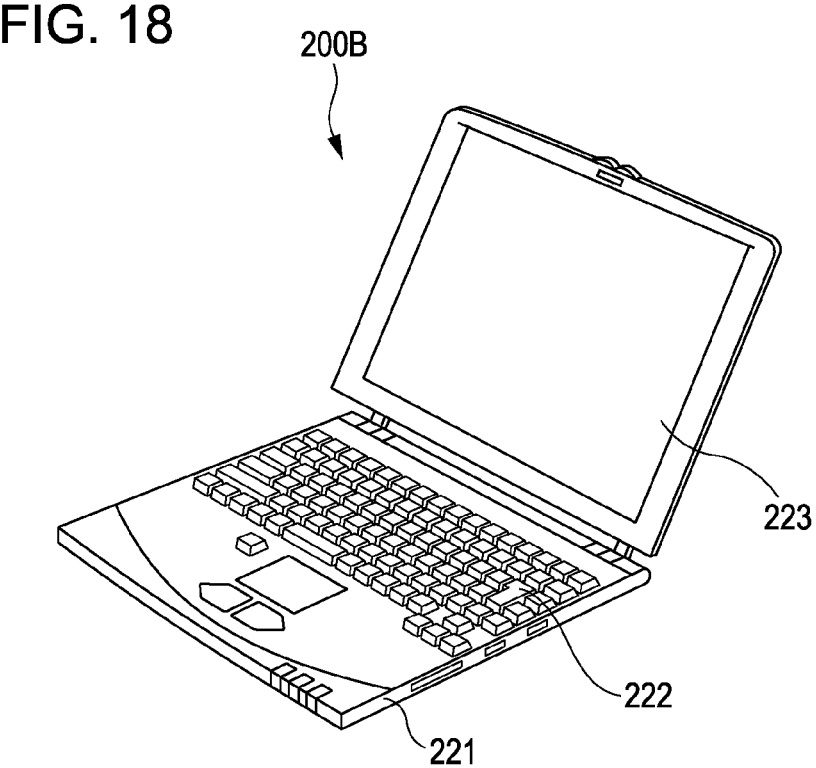
FIG. 18 is a perspective view showing a notebook type personal computer which uses the display device according to one of the embodiments.

FIG. 18 is a perspective view showing a notebook type personal computer which uses the display device according to one of the above embodiments.

A notebook type personal computer 200B according to this example includes a main body 221, a keyboard 222 which is used when characters and the like are to be input, a display portion 223 displaying images, and the like and is formed by using the display device according to one of the above embodiments as the display portion 223.

Figure 19:
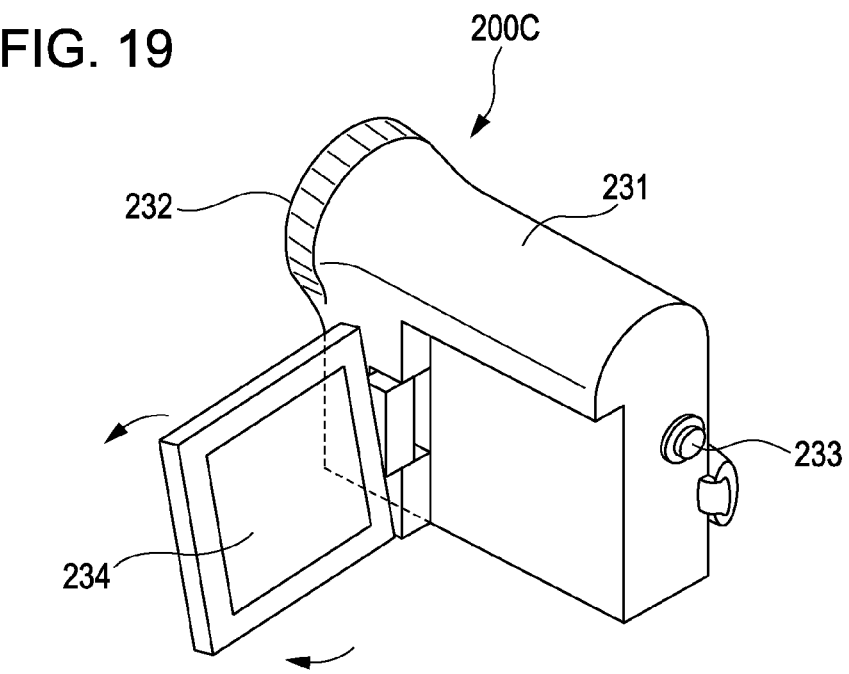
FIG. 19 is a perspective view showing a video camera which uses the display device according to one of the embodiments.

FIG. 19 is a perspective view showing a video camera which uses the display device according to one of the above embodiments.

A video camera 200C according to this example includes a main body 231, a photographic lens 232 provided on a surface facing a front side, a start/stop switch 233 used for photographing, a display portion 234, and the like and is formed by using the display device according to one of the above embodiments as the display portion 234.

FIGS. 20A to 20G are views each showing a portable terminal device, such as a mobile phone, which uses the display device according to one of the above embodiments, FIG. 20A is a front view when the mobile phone is opened, FIG. 20B is a side view thereof, FIG. 20C is a front view when the mobile phone is closed, FIG. 20D is a left side view, FIG. 20E is a right side view, FIG. 20F is a top plan view, and FIG. 20G is a bottom plan view of the mobile phone.

A mobile phone 200D according to this example includes an upper side housing 241, a lower side housing 242, a connection portion (hinge portion in this example) 243, a display 244, a sub-display 245, a picture light 246, a camera 247, and the like and is formed by using the display device according to one of the above embodiments as the display 244 and the sub-display 245.

It should be understood by those skilled in the art that various modifications, combinations, sub-combinations and alterations may occur depending on design requirements and other factors insofar as they are within the scope of the appended claims or the equivalents thereof.

What is claimed is:
1. A display device comprising:
 a base body having a pixel area in which pixels are arranged in a matrix;
 an organic planarizing film composed of an organic film on the base body;
 a protective film on the organic planarizing film;
 a dry-etched layer on the protective film;
 a conductive film on the dry-etched layer; and a groove formed by removal of at least a portion of the organic planarizing film so as to expose a primary surface of the base body, the groove located outside the periphery of the pixel area, wherein, the protective film forms a counter electrode of the pixels and terminates in the groove.

2. The display device according to claim 1, wherein the groove is an area in which, outside the periphery of the pixel area, the organic planarizing film is partly removed in a direction parallel to the primary surface of the base body and is entirely removed in a direction perpendicular thereto.

3. The display device according to claim 2, wherein the groove surrounds the pixel area along the entire periphery thereof.

4. The display device according to claim 2, wherein the groove surrounds portions of the periphery of the pixel area.

5. The display device according to claim 1, wherein the organic planarizing film outside the groove is entirely removed.

6. The display device according to claim 1, wherein the protective film includes one element selected from the group consisting of silicon, indium, tin, zinc, titanium, aluminum, molybdenum, tantalum, chromium, tungsten, and silver.

7. The display device according to claim 1, wherein the base body comprises a layer, a film or a substrate including one element selected from the group consisting of silicon, indium, tin, zinc, titanium, aluminum, molybdenum, tantalum, chromium, tungsten, and silver.

8. A display device comprising:
a first substrate having a pixel area in which pixels are arranged in a matrix;
a second substrate facing the first substrate;
a liquid crystal layer between the first substrate and the second substrate;
an organic planarizing film composed of an organic film on the first substrate, the organic planarizing film formed by dry etching;
a counter electrode on the organic planarizing film;
a dry-etched layer on the counter electrode;
pixel electrodes on the dry-etched layer; and
a groove formed by removal of at least a portion of the organic planarizing film so as to expose a primary surface of the first substrate, the groove located outside the periphery of the pixel area,
wherein,
the counter electrode terminates in the groove.

9. An electronic apparatus comprising:
a display device,
wherein, the display device includes:
a base body having a pixel area in which pixels are arranged in a matrix,
an organic planarizing film composed of an organic film on the base body,
a protective film on the organic planarizing film,
a dry-etched layer on the protective film,
a conductive film on the dry-etched layer, and
a groove formed by removal of at least a portion of the organic planarizing film so as to expose a primary surface of the base body, the groove located outside the periphery of the pixel area, and
the protective film forms a counter electrode of the pixels and terminates in the groove.

10. An electronic apparatus comprising:
a display device,
wherein, the display device includes:
a first substrate having a pixel area in which pixels are arranged in a matrix,
a second substrate facing the first substrate,
a liquid crystal layer between the first substrate and the second substrate,
an organic planarizing film composed of an organic film on the first substrate, the organic planarizing film formed by dry-etching,
a counter electrode on the organic planarizing film,
a dry-etched layer on the counter electrode,
pixel electrodes on the dry-etched layer, and
a groove formed by removal of at least a portion of the organic planarizing film so as to expose a primary surface of the base body, the groove located outside the periphery of the pixel area, and
the counter electrode terminates in the groove.

* * * * *